(12) United States Patent
Masson

(10) Patent No.: US 6,642,452 B2
(45) Date of Patent: Nov. 4, 2003

(54) LIGHTED SWITCH OR OUTLET PLATE WITH LABELING DESIGNATION

(75) Inventor: James Robert Masson, Gainesville, FL (US)

(73) Assignee: iPlate Technologies, Inc., Gainesville, FL (US)

( * ) Notice: Subject to any disclaimer, the term of this patent is extended or adjusted under 35 U.S.C. 154(b) by 0 days.

(21) Appl. No.: 09/944,702

(22) Filed: Aug. 31, 2001

(65) Prior Publication Data

US 2003/0042038 A1 Mar. 6, 2003

(51) Int. Cl.[7] ................................................. H02G 3/14
(52) U.S. Cl. .......................... 174/66; 174/67; 174/135; 220/241; 220/242; 362/95; 362/84; 313/510
(58) Field of Search ............................ 174/66, 67, 135, 174/53; 220/241, 242; 362/95, 84; 313/510, 506; D8/353; D13/177; 200/333, 310, 317

(56) References Cited

U.S. PATENT DOCUMENTS

| | | |
|---|---|---|
| 1,079,271 A | 11/1913 | Smedley |
| 1,595,831 A | 8/1926 | Gans |
| 1,930,610 A | 10/1933 | Despard |
| 2,109,790 A | 3/1938 | Batcheller |
| 2,420,000 A | 5/1947 | Linton |
| 2,512,975 A | 6/1950 | Sherrard |
| 2,515,820 A | 7/1950 | Clark |
| 2,809,316 A | 10/1957 | Jeges |
| 3,056,897 A | 10/1962 | Knochel et al. |
| 3,061,716 A | 11/1962 | Benander |
| 3,121,817 A | 2/1964 | Saviers |
| 3,307,030 A | 2/1967 | De Francisco |
| 3,953,933 A | 5/1976 | Goldstein |
| 4,138,620 A | 2/1979 | Dickson |
| 4,425,725 A | 1/1984 | Moustakas et al. |
| 4,514,789 A | 4/1985 | Jester |
| 4,565,023 A | 1/1986 | Carlisle |
| 4,707,564 A | 11/1987 | Gonzales |
| 4,755,913 A | 7/1988 | Sleveland |
| 4,774,641 A | 9/1988 | Rice |
| 4,833,277 A * | 5/1989 | Jacoby et al. ........... 220/241 X |
| D354,217 S | 1/1995 | Sneary |
| 5,642,929 A | 7/1997 | Ushimaru |
| 5,660,459 A | 8/1997 | Appelberg |
| 5,662,408 A | 9/1997 | Marischen |
| 5,670,776 A | 9/1997 | Rothbaum |
| 5,675,125 A | 10/1997 | Hollinger |
| 5,693,911 A | 12/1997 | Sydow |
| 5,735,708 A | 4/1998 | Arnett et al. |
| 5,769,653 A | 6/1998 | Osterbrock et al. |
| 5,918,396 A | 7/1999 | Jung |
| 6,026,605 A * | 2/2000 | Tippett .................. 174/66 |
| 6,172,301 B1 * | 1/2001 | Goodsell ................ 174/66 |
| 6,178,681 B1 * | 1/2001 | Caloia et al. ............ 174/66 X |
| 6,179,431 B1 | 1/2001 | Chieu |
| 6,281,440 B1 * | 8/2001 | Baldwin et al. .......... 174/67 X |

* cited by examiner

Primary Examiner—Dhiru R Patel
(74) Attorney, Agent, or Firm—Paul & Paul

(57) ABSTRACT

A cover plate for an electric switch, outlet or plug is provided, wherein electroluminescent sheeting provides lighted indicia associated with an opening in the plate, to convey information about the cover plate, such as the appliance with which the switch may be associated, the circuit with which an outlet may be associated or the like.

8 Claims, 6 Drawing Sheets

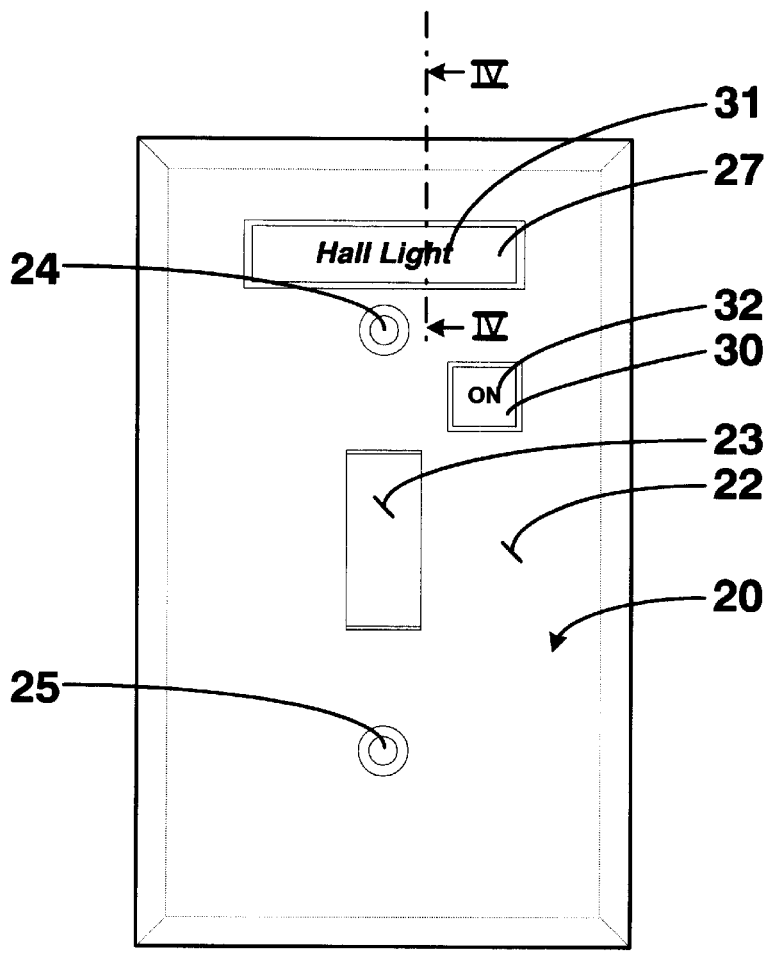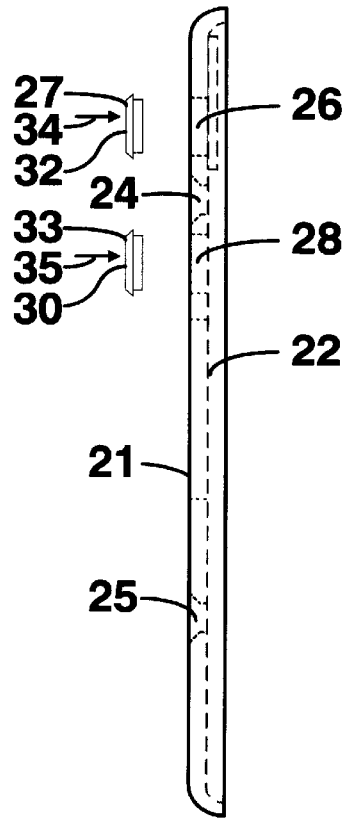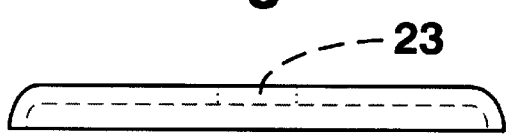
Fig. 1
Fig. 2
Fig. 3

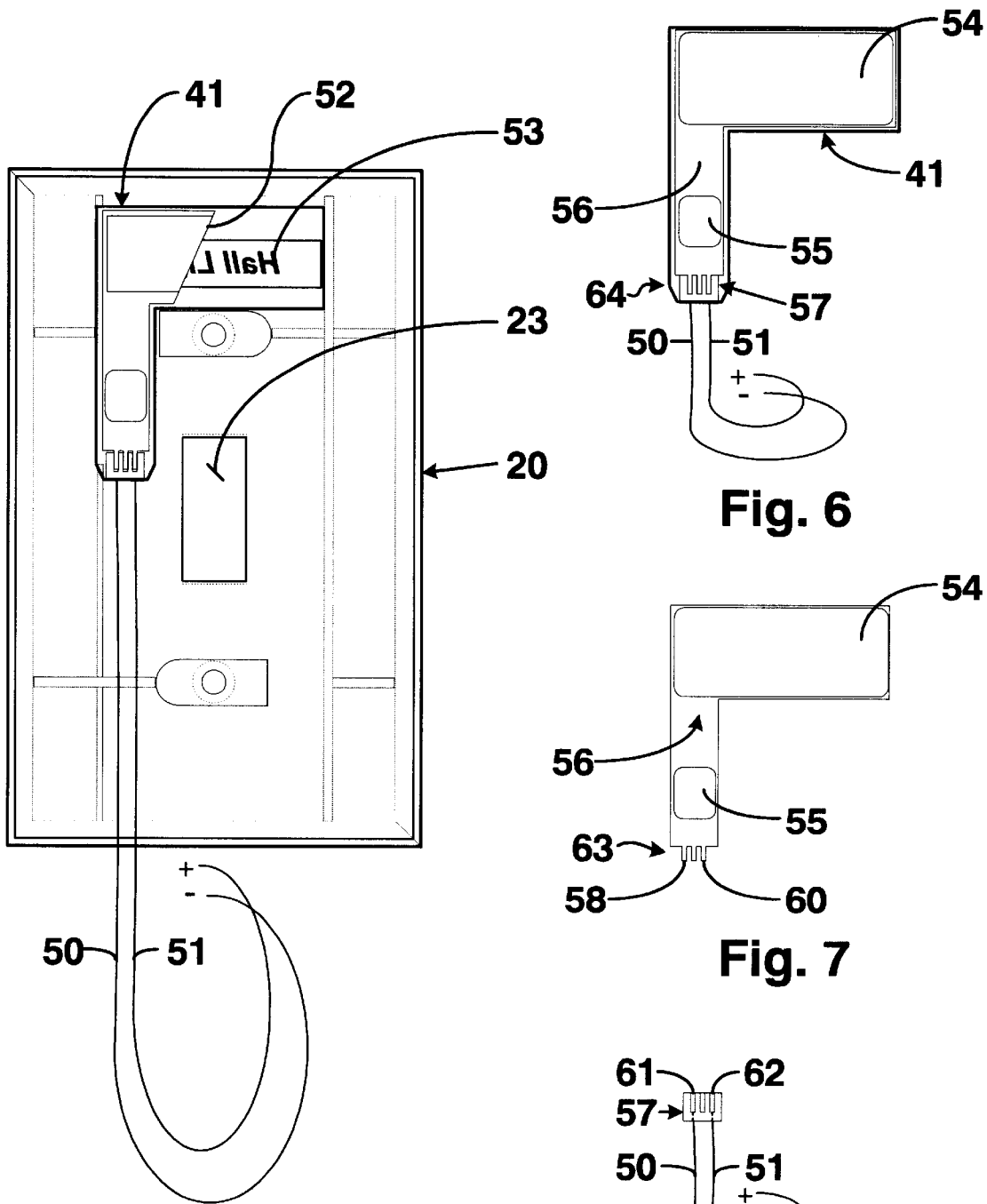

LIGHTED SWITCH OR OUTLET PLATE WITH LABELING DESIGNATION

BACKGROUND OF THE INVENTION:

In the art dealing with electric circuits, whether commercial, residential, or industrial, it is known to have switches controlling lighted areas. Customarily, such switches are wall-mounted. It is also known to use electric outlets, whereby appliances may be plugged into the outlets to be electrically connected for supplying power to the appliances.

It is also known in the art that, in some cases, as with wall-mounted switches or the like, an electric light may be employed in connection with the switch, powered to light the switch area, for example, for ease of location of the toggle or button switch in the dark. Generally, such lighting of switches is by employment of additional incandescent bulbs electrically connected to the switch itself, to be powered thereby.

SUMMARY OF INVENTION:

The present invention is directed toward providing, for an electric switch, outlet, or other electric circuit element, a cover plate that is adapted to fit over a conventional electric switch, outlet or the like, to be mounted on the electric box that houses the switch, or outlet in the case of an outlet, and wherein a zone of lit area is provided, drawing its power from the electrical connection to the switch, outlet or the like, but wherein indicia is provided, directly associated with the lighted zone, to be lit thereby, in which the lighted indicia provides a useful labeling designation that is intimately associated with that particular switch, outlet or the like. The lighted zone is made lighted by using electroluminescent sheeting, powered by the electric circuit provided to the switch, outlet or the like, in which said sheeting lights up the entire zone in which the labeling or indicia exists.

Accordingly, it is a primary object of this invention to provide a novel means for lighting up and labeling a zone on a cover plate for a switch, outlet or the like, in which information can be conveyed to the person using the switch, outlet or the like.

It is another object of this invention to accomplish the above object, wherein electroluminescent sheeting provides one or more lighted zones for the cover plate for a switch, outlet or the like.

It is a further object of this invention to accomplish the above objects, wherein a protective cover is provided for the electroluminescent sheeting, disposed behind the plate member of the cover plate, sandwiching the electroluminescent sheeting between itself and the plate member of the cover plate.

It is yet another object of this invention to accomplish the above objects, wherein electroluminescent sheeting has its electrical connection provided thereto by a separate, removable connector element, that, in turn, is electrically connected to the switch, outlet or the like.

It is a further object of this invention to provide an apparatus in accordance with the objects set forth above, in which a number of various different designations may be made on a multiple-switch plate, multiple-outlet plate (or gang plate), wherein individual switches, outlets or the like may be designated as controlling individual rooms, individual electric functions, or associated with individual circuits of a multi-circuit board.

Other objects and advantages of the present invention will be readily apparent upon a reading of the following brief descriptions of the drawing figures, detailed descriptions of the preferred embodiments, and the appended claims.

BRIEF DESCRIPTIONS OF THE DRAWING FIGURES:

FIG. 1 is a front elevational view of a cover plate for an electric switch in accordance with this invention, wherein there are two zones having indicia thereon, one designating a location and the other designating "ON".

FIG. 2 is a side elevational view of the cover plate of FIG. 1, wherein lenses that carry the designations are shown adapted for insertion into the windows of the plate member of the cover plate.

FIG. 3 is a bottom view of the cover plate of FIG. 1.

FIG. 5 is a rear view of the cover plate of FIG. 1, with the protective cover for the electroluminescent sheeting removed, and with electric wires that provide power to the electroluminescent sheeting connector being illustrated at the lower end thereof.

FIG. 6 is a rear view of the electroluminescent sheeting that is fragmentally shown in FIG. 5.

FIG. 7 is a rear view similar to that of FIG. 6, but wherein the electroluminescent sheeting is shown without the electrical connector element connected thereto as is shown in the sub-assembly of FIG. 6.

FIG. 8 is a view of the electrical connector element and its electric wires, adapted for connection to the sheeting as shown in FIG. 7, as shown in the sub-assembly of FIG. 6.

Figure 9:
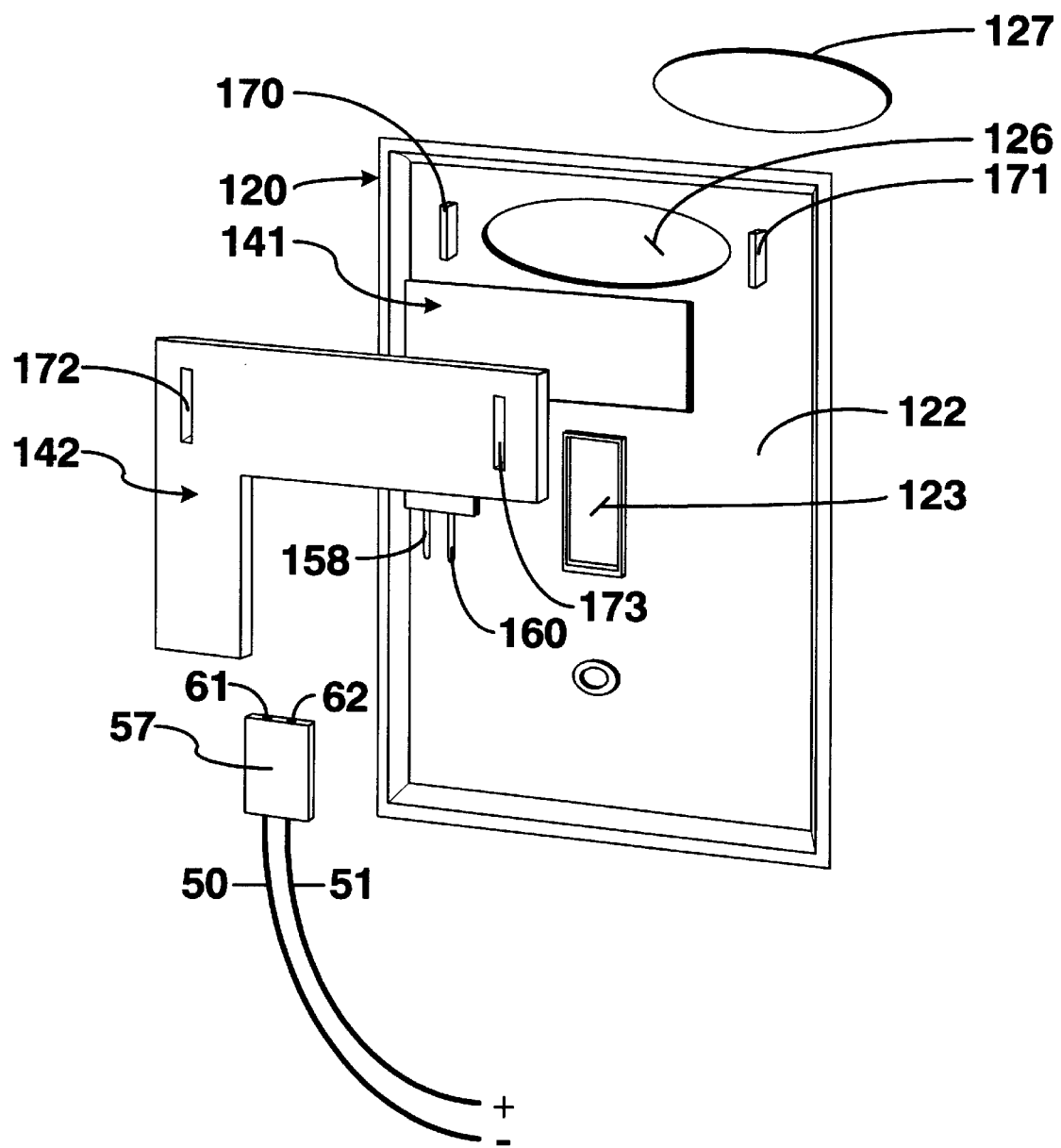

FIG. 9 is a rear exploded view of a cover plate similar to that of FIG. 1, but wherein the lens is oval shaped, rather than rectangular, and wherein the protective cover for the electroluminescent sheeting is shown adapted for juxtaposition behind the sheeting when the sheeting is installed behind the plate member, wherein the electrical connector element is adapted for connection to the electroluminescent sheeting.

Figure 10:
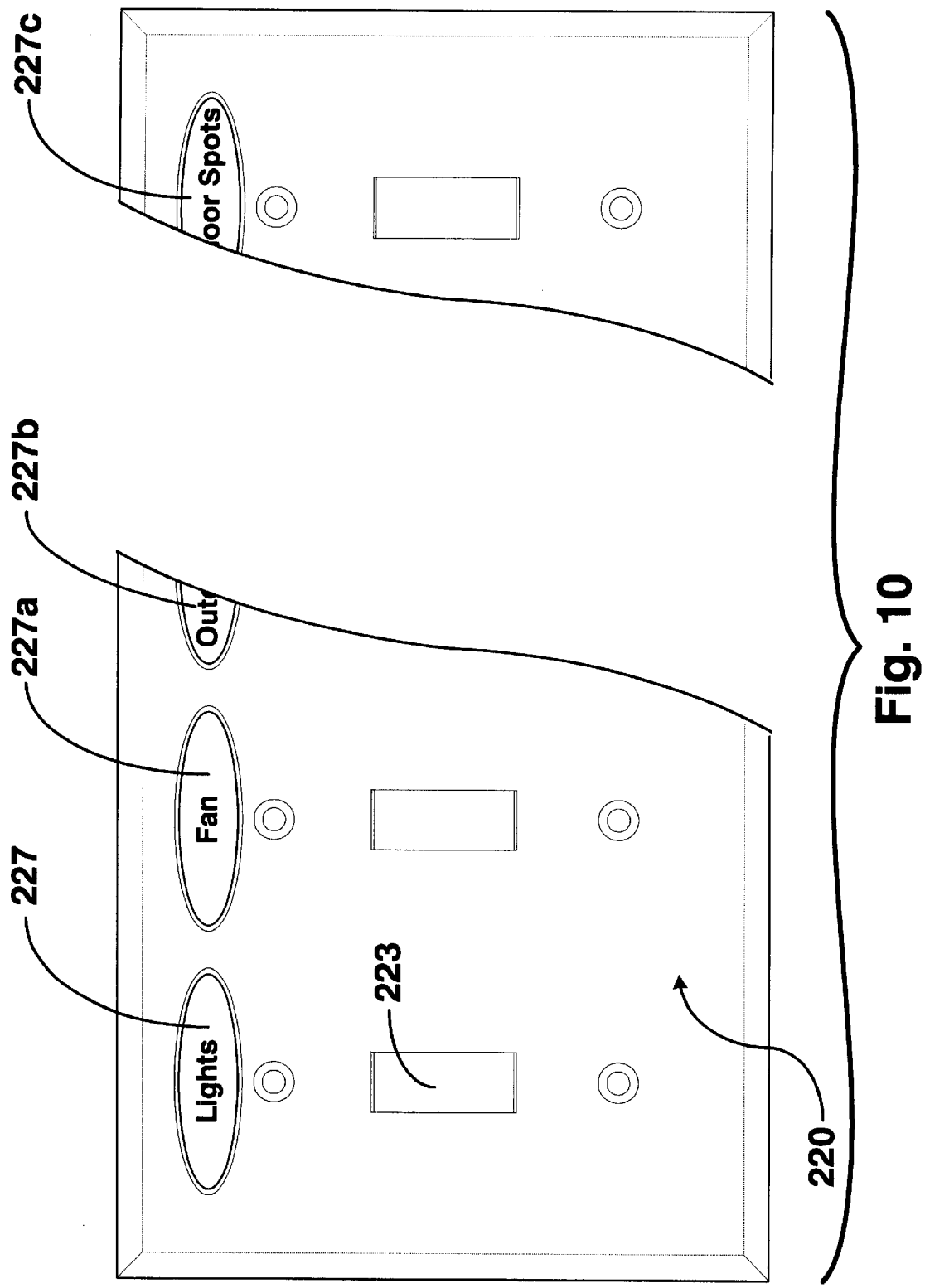

FIG. 10 is a front fragmental illustration of another cover plate in accordance with this invention, wherein the plate is of the gang plate type, and wherein the lenses are shown as having indicia for labeling different appliance functions, such as lights, fan, outdoor spots, indoor spots, etc.

Figure 11:
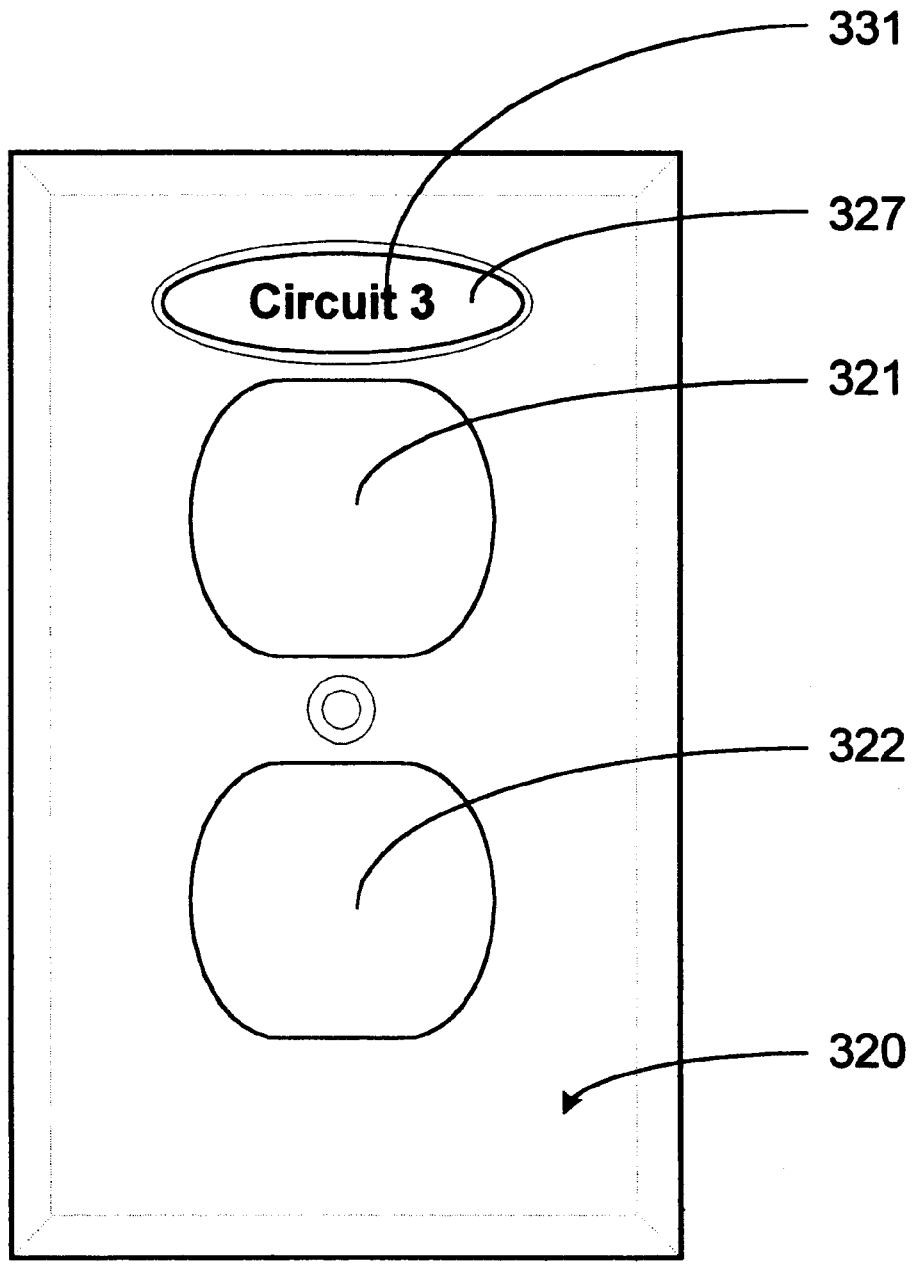

FIG. 11 is a front elevational view of an alternative cover plate of this invention, being of the outlet type, and wherein the lens has representative indicia for labeling the outlet by the circuit to which it is connected.

DETAILED DESCRIPTIONS OF THE PREFERRED EMBODIMENTS:

Referring now to the drawings in detail, reference is first made to FIG. 1, wherein a cover plate 20 is shown that is adapted for use with an electric switch and has a front 21 and a rear 22.

An opening 23 is provided for receiving a toggle or other switch therethrough. Suitable conventional openings 24 and 25 are provided for receiving screws therein, to fasten the plate 20, to mating fitted openings in the front of an electric switch disposed in an electric box (not shown).

An opening 26 is provided for receiving a substantially transparent layer in the form of a lens 27 therein, the opening 26 and lens 27 being generally rectangular in configuration, as shown in FIG. 1.

An additional opening 28 is provided for receiving a lens 30 therein as shown.

The lens 27 is preferably transparent, and has indicia 31 disposed on its left surface 32 as shown in FIGS. 1 and 2, with the indicia 31 indicating, for example, the appliance that is controlled by the switch that the plate 20 is applied thereover, in this case being "Hall Light".

The lens 30 has indicia 32 disposed on its left surface 33 as viewed in FIGS. 1 and 2, and carries indicia for indicating whether or not the switch is in the "ON" position.

Figure 4:
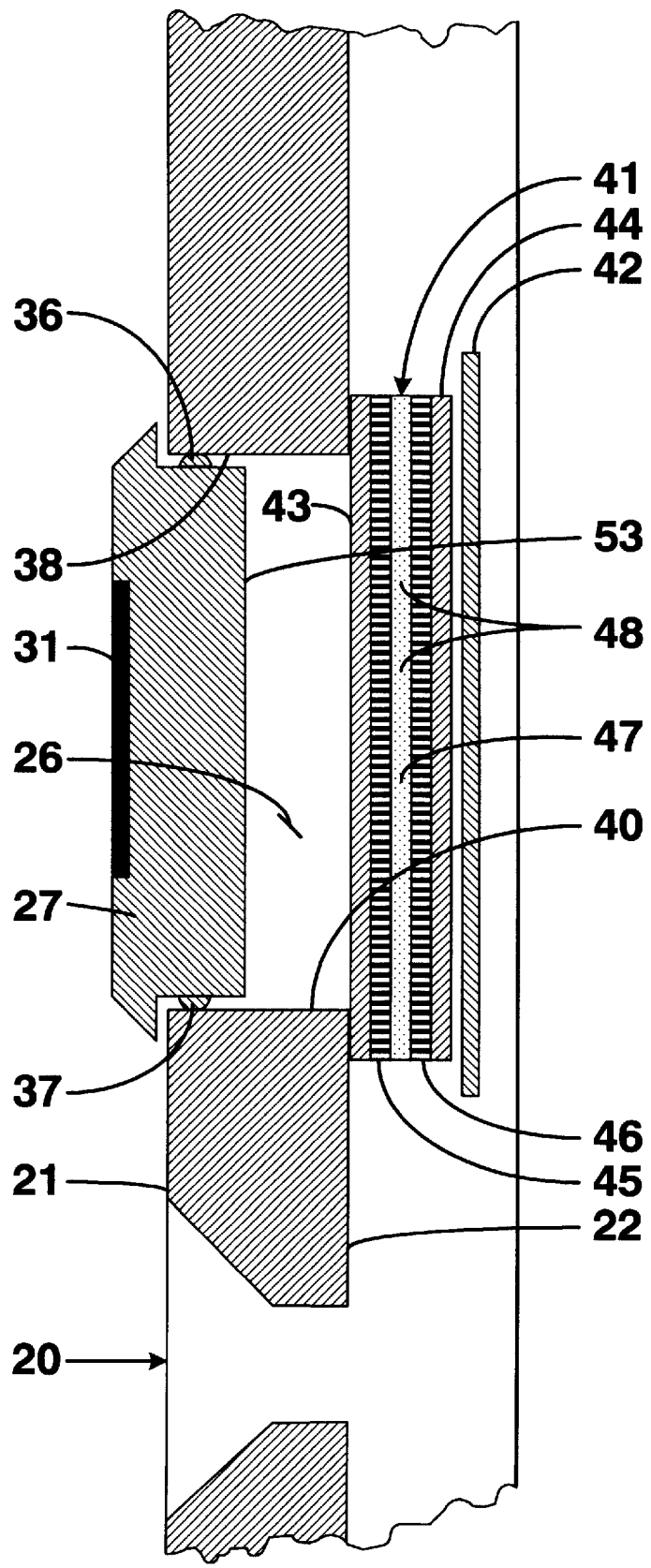
FIG. 4 is an enlarged fragmentary vertical sectional view, taken through the plate member and a lens of the cover plate of FIG. 1, and wherein the electroluminescent sheeting disposed behind the plate member is illustrated in section, with its protective cover to the right thereof.

The lenses 27 and 30 are adapted to be received in the respective openings 26 and 28, by being moved rightward as shown, in the direction of the arrows 34 and 35, respectively, such that the lenses may frictionally snap into their associated openings for frictional engagement therein, as for example, by engagement of snap-in protrusions 36, 37, carried by the lens 27 as illustrated in FIG. 4, for frictional engagement against associated walls 38, 40 of the opening 26.

Also, as shown in FIG. 4 an electroluminescent element in the form of electroluminescent sheeting 41 is provided, disposed against the rear surface 22 of the plate 20.

The electroluminescent sheeting 41 is sandwiched between the surface 22 of the plate 20 and a protective cover 42, for protecting the electroluminescent sheeting 41 from undesirable dust, undesired electrical contact or the like during its operation.

The electroluminescent sheeting 41 comprises preferably a five-layer sandwich comprised of outer layers 43, 44 of a protective non-conductive coating, such as a polymer coating or the like, inside which are conductive sheeting layers 45, 46, preferably of copper construction, having sandwiched therebetween a layer of electroluminescent phosphor material 47. The layer 47 is preferably a nonconductive dielectric layer in which are embedded phosphor particles 48. Such is the preferred construction of the electroluminescent sheeting 41, although other constructions may be employed, such as where the metal layers 45, 46 are combined with protective layers 43, 44.

In general, the electroluminescent sheeting 41, works such that, when an electric potential is provided by means of the electric connections 50, 51 that are electrically connected to the leads that power the switch or the like to which the plate 20 is applied, the electric connections 50, 51 may deliver power to the electroluminescent sheeting 41 as shown in FIG. 5.

With specific reference to FIGS. 5 through 8, the electroluminescent sheeting 41 is shown, fragmentally broken away in FIG. 5 at 52, to reveal the rear 53 of the lens 27.

The sheeting 41, shown more clearly in FIG. 6 has two electroluminescent zones 54 and 55, corresponding to the areas behind the openings 26, 28, to provide lighting for the indicia 31, 32, on the lenses 27, 30 disposed in front of such zones 54, 55.

The electroluminescent sheeting 41 is provided with means 64 for making electrical connection with the electric circuit element for providing an electric voltage potential to the electroluminescent sheeting 41. The electroluminescent phosphor material 47 sandwiched between conductive sheeting layers 45, 46 provides a light source when the means 64 for making electrical connection with the electric circuit element provides a voltage potential between the conductive sheeting layers 45, 46. As used herein, "electric circuit element" is a switch an outlet or a plug.

The sheeting 41 is comprised of a lighting component 56, shown most clearly in FIG. 7 and a connector component 63 comprising the electric connection prongs 58, 60. The lighting component 56 has the electroluminescent zones 54, 55 thereon, as shown, and terminates in electric connection prongs 58, 60, adapted to be received, respectively, in female receptacles 61, 62 in connector element 57, to receive electrical connection via suitable electric connections such as wires 50, 51, as described above. In the, illustrated example of FIGS. 1–8, the means 64 for making electrical connection with the electric circuit element comprises the connector component 63, which includes the electric connection prongs 58, 60, the connector element 57, and the wires 50, 51.

With reference to FIG. 9, there is shown, in exploded view, an assembly substantially similar to that illustrated in FIG. 5, except that the plate 120 is provided with an elliptical lens 127, to fit into an elliptical opening 126. Otherwise, the electroluminescent sheeting 141, like the electroluminescent sheeting 41 of FIG. 5 is adapted to be sandwiched between the rear 122 of the plate 120 and the protective cover 142. Fastening means is provided in the form of rearwardly protruding lugs 170, 171, adapted to engage in corresponding openings 172, 173, of protective cover 142, in snap-in engagement. Otherwise, the electroluminescent sheeting 141 likewise has downwardly depending prongs 158, 160, adapted to be received in associated female openings 61, 62, respectively.

With reference now to FIG. 10, a gang switch plate 220 is illustrated, from the front, and in fragmentary illustration, to indicate that any desired number of electric circuit elements may be covered by a single plate having a similar number of switch openings 223 therein, to accommodate any number of desired switches, with each switch having an associated lens 227, 227a, 227b, or 227c, to correspond with a particular room, or function, etc. that is to be controlled by the switch that becomes associated with the respective opening 223 under each lens 227, 227a, 227b, 227c.

Accordingly, the switches associated with plate 220 may correspond to "Lights", as shown for lens 227, or "Fan" 227a, or "Outdoor Spots" 227b, or "Indoor Spots" 227c, etc.

With reference to FIG. 11, it will be seen that an outlet plate 320 is provided, for accommodating a conventional outlet having a pair of outlet openings 321, 322, and with an elliptical lens 327 therein. The plate 320 illustrates how it may be desirable to use the lens 327 to designate the electrical circuits of the house, commercial establishment, etc. into which the outlet with which the plate 320 is used, is connected. It will be understood that, as with the "gang" plate of FIG. 10, the plate 320 may likewise be constructed to have a number of openings to cover a number of outlets, each with an associated lens 327 with appropriate labeling indicia 331 carried thereby.

It will also be apparent that each lens in accordance with this invention will preferably have its indicia 31, 32, 331, etc. disposed on or embedded in the outer surface thereof, although lenses could be used over top the indicia, or to the left thereof, as viewed in FIG. 4, protectively covering the indicia, if desired.

It will also be noted that the lenses may employ different colors, different levels of illumination, different letter or number fonts, etc., all within the spirit and scope of the invention.

The electroluminescent sheeting, for its conductive sheeting layers 45, 46, may comprise aluminum or copper layers, of various thicknesses, including foil construction as may be desired. The protective layers 43, 44, while being non-conductive, may be of polymer or other plastic construction, or of any other suitable construction for providing the desired protection, and preferably for providing electrical protection against shorting out the electroluminescent element.

Additionally, in place of the "ON" indicia 32, for example, the same could employ for example a red or green dot to indicate polarity, as an alternative.

The electroluminescent sheeting may be constructed as indicated herein, and may alternatively employ some of the embodiments set forth in U.S. Pat. No. 2,809,316, or in U.S. Pat. No. 3,056,897, as may be desired.

It will be apparent from the foregoing that various modifications may be made, in the details of construction, as well as in the use and operation of cover plates in accordance with this invention, all within the spirit and scope of the invention as set forth in the appended claims.

What is claimed:

1. A cover plate for an electric switch, outlet or plug to be mounted on an electrical box comprising:
    (a) a generally planar plate member adapted to cover said switch, said outlet or said plug, and said plate member having an opening means in said plate member adapted to receive a switch actuator, said plug, or portion of said outlet therethrough, said plate member having at least one window therein;
    (b) electroluminescent sheeting being disposed behind a rear surface of said plate member and a protective cover for protecting said electroluminescent sheeting from undesirable dust or undesirable electrical contact during its operation; said electroluminescent sheeting being provided with means for making electrical connections to the connections that power said switch or said outlet or said plug for providing an electric voltage potential to said electroluminescent sheeting, said electroluminescent sheeting comprising outer insulated, inner conductive sheeting layers, and an electroluminescent phosphor material being sandwiched between said inner conductive sheeting layers to provide a light source when said means for making electrical connections are electrically connected to the electrical connections that power said switch or said outlet or said plug to provide said voltage potential between said inner conductive sheeting layers;
    (c) a substantially transparent layer positioned at said at least one window
    (d) indicia associated with said substantially transparent layer, said electroluminescent sheeting being disposed behind said at least one window and behind said substantially transparent layer and said indicia whereby when said electric voltage potential is applied to said inner conductive sheeting layers, said indicia is electroluminescently lit through said at least one window.

2. The cover plate of claim 1, wherein said at least one window comprises a plurality of windows in said plate member, and with a substantially transparent layer and indicia associated with each of said plurality of windows; with said electroluminescent sheeting being provided for each of said plurality of windows and its substantially transparent layer and its indicia.

3. The cover plate of claim 2, wherein said indicia associated with at least one of said plurality of windows is adapted for indicating whether or not the said switch, said outlet or said plug is turned "ON".

4. The cover plate of claim 2, wherein said plate member is for a gang of switches, outlets or plugs, and said plurality of windows in said plate member correspond in number to at least the number of said switches, said outlets, or said plugs in the gang of said switches, said outlets or said plugs.

5. The cover plate of claim 1, wherein said substantially transparent layer comprises a substantially transparent lens positioned at said at least one window, said substantially transparent lens forming said substantially transparent layer.

6. The cover plate of claim 1, wherein said indicia comprises identification for said switch, said outlet or said plug.

7. The cover plate of claim 1, wherein said indicia comprises electric circuit identification.

8. The cover plate of any one of claims 1, 2, 5, 6, 7, 3 or 4, wherein said indicia comprises one or more words.

* * * * *